United States Patent [19]

Pralus et al.

[11] Patent Number: 5,124,009

[45] Date of Patent: * Jun. 23, 1992

[54] CONSUMPTION OF HYPOCHLORITE VALUES CONTAINED IN CHLORATE SOLUTIONS OF ELECTROLYSIS

[75] Inventors: Christian Pralus, Saint-Cyr-au-Mont-d'Or; Jean-Claude Chassagne, Grenoble, both of France

[73] Assignee: Atochem, Puteaux, France

[*] Notice: The portion of the term of this patent subsequent to Apr. 23, 2008 has been disclaimed.

[21] Appl. No.: 482,929

[22] Filed: Feb. 22, 1990

[30] Foreign Application Priority Data

Feb. 22, 1989 [FR] France ............................... 89 02535

[51] Int. Cl.$^5$ .............................................. C25B 1/24
[52] U.S. Cl. ..................................... 204/95; 204/129; 210/759; 423/475
[58] Field of Search .................. 204/95, 129; 210/759; 423/475

[56] References Cited

U.S. PATENT DOCUMENTS

4,075,094  2/1978  Carlson ............................... 210/756
4,888,099  12/1989  Welander et al. ..................... 204/95

Primary Examiner—John Niebling
Assistant Examiner—David G. Ryser
Attorney, Agent, or Firm—Burns, Doane, Swecker & Mathis

[57] ABSTRACT

The objectionable hypochlorite values, ClO$^-$ ions, contained in a solution of an alkali metal chlorate produced by the electrolysis of an aqueous solution of the corresponding chloride of the alkali metal, are effectively destroyed (consumed) without adversely affecting the valence state of the hexavalant chromium values also contained therein, by intimately contacting such chlorate solution with an effective amount of hydrogen peroxide such that the molar ratio hydrogen peroxide/hypochlorites is at least one and no greater than 3 and the molar ratio available hydrogen peroxide/hypochlorites is at least one.

7 Claims, No Drawings

CONSUMPTION OF HYPOCHLORITE VALUES CONTAINED IN CHLORATE SOLUTIONS OF ELECTROLYSIS

CROSS-REFERENCE TO COMPANION APPLICATION

Copending application Ser. No. 07/484,920, filed concurrently herewith and assigned to the assignee hereof.

BACKGROUND OF THE INVENTION

1. Field of the Invention:

The present invention relates to the destruction, or consumption, of hypochlorites or $ClO^-$ ions present in a chlorate solution of an alkali metal, such as the solution of sodium chlorate resulting from the electrolysis of an aqueous solution of the chloride of said alkali metal, for example a solution of sodium chloride, prior to the crystallization of the chlorate values therefrom.

2. Description of the Prior Art:

Except for allowing the chlorate solution to remain in a so-called evolution reactor upon its withdrawal from the electrolysis cell for a period of time that is incompatible with the requirements of industrial production, it is known to this art that significant amounts of hypochlorite remain in such solution after evolution, to cause significant corrosion of the crystallizer, which typically is made of carbon or stainless steel.

It is also known to introduce additives into the chlorate solutions, such as, for example, sulfur dioxide, ammonia or urea.

However, sulfur dioxide requires careful handling, is harmful in nature, and results in the formation of sulfates, while at the same time the sulfates are being eliminated from the brines to be electrolyzed.

Ammonia in turn may form chloramines, which themselves are corrosive and which present the risk of explosion. This is also the case if urea is added, according to published European Application No. 0,266,129.

Thus, serious need continues to exist in this art for means other than mere passage of time or the above additives for destroying as completely as possible the hypochlorite values contained in a chlorate solution prior to the crystallization of the chlorate therefrom.

Although it is known that hydrogen peroxide reacts with $ClO^-$ ions, no process has to date been described for the destruction of such ions by means of $H_2O_2$ introduced into an alkali metal chlorate solution emanating from the electrolysis of a chloride solution of said alkali metal in the presence of hexavalent chromium, typically in the form of a bichromate thereof, such as sodium bichromate $Na_2Cr_2O_7$. The presence and conservation of the hexavalent chromium are necessary for the chromate process, as particularly described in the above '129 European application.

In such a case, the disappearance of hexavalent chromium would indeed be expected, for example if the chlorate solution is treated with a sulfur compound, such as water soluble sulfides according to FR 2,168,530.

SUMMARY OF THE INVENTION

Accordingly, a major object of the present invention is the provision of an improved technique for the effective destruction of the $ClO^-$ ions in aqueous chlorate solutions without adversely affecting the amount of hexavalent chromium concurrently present with the $ClO^-$ ions, by treating such aqueous chlorate solutions with an effective $ClO^-$ consuming amount of hydrogen peroxide, and which improved technique conspicuously ameliorates those disadvantages and drawbacks to date characterizing the state of this art, particularly in regard to safety.

Briefly, the present invention features a process for the destruction of the hypochlorite values contained in a solution of a chlorate of an alkali metal which is produced by the electrolysis of an aqueous solution of the chloride of such alkali metal, without adversely affecting the valence state of the hexavalent chromium values also contained therein, by intimately contacting said perchlorate solution with an effective $ClO^-$ consuming amount of hydrogen peroxide, namely, an amount such that the molar ratio hydrogen peroxide/hypochlorites is equal to or higher than 1 and no greater than 3, while assuring a molar ratio available hydrogen peroxide/hypochlorites equal to or higher than 1.

DETAILED DESCRIPTION OF THE PREFERRED EMBODIMENTS OF THE INVENTION

More particularly according to the present invention, by the term "available hydrogen peroxide" is intended the hydrogen peroxide which is not consumed in the chlorate solution in the absence of $ClO^-$ ions.

In order to determine the amount of hydrogen peroxide which may be consumed by compounds other than the hypochlorites, metallic ions for example, the starting chlorate solution of the invention can thus be used, after the $ClO^-$ ions have been essentially quantitatively eliminated therefrom, notably after a sufficiently long period of time of evolution of the initial chlorate solution.

According to the present invention, it is typically unnecessary that the molar ratio available hydrogen peroxide/hypochlorites be greater than 1.1.

If more hydrogen peroxide is added to the chlorate solution than that necessary to assure a molar ratio available hydrogen peroxide/hypochlorites equal to 1.1, for example up to about 3 moles of hydrogen peroxide per mole of hypochlorites, the valence state of the hexavalent chromium was not adversely affected over a period of time 5 to 10 times longer than the case where no excess is added, in which event it is on the order of 5 min and even less.

The hydrogen peroxide is advantageously used in the form of an aqueous solution therof, for example a 50% by weight solution of hydrogen peroxide.

The process of the invention is of particular industrial value in the case of the production of sodium chlorate, where the aqueous chlorate solution containing the hypochlorites to be destroyed is that emanating from the evolution reactor, as mentioned above.

This chlorate solution may then contain, for example, per liter: 200 to 700 g, typically about 500 to 600 g sodium chlorate, 100 to 200 g sodium chloride, 0.2 to 10 g, frequently approximately 3 to 6 g sodium bichromate, $Na_2Cr_2O_7$, and an amount of $ClO^-$ ions corresponding to an amount of NaClO of 0.1 g to 1.5 g.

The temperature and pH at which the destruction or consumption of the $ClO^-$ ions takes place are essentially the normal values of the chlorate solution upon withdrawal from the evolution reactor. For example, the pH is maintained as constant as possible and ranges from 5.5 to 7, and the temperature, which may vary over rather wide limits, ranges, for example, from about 40° to 80° C., typically from 60° to 70° C.

The reactor for the destruction of the hypochlorites is of course preferably an agitated reactor, provided with venting means. It is fabricated, for example, from a material which may be based, e.g., on reinforced polyvinyl chloride.

The destruction of the hypochlorites is essentially complete according to the invention; the final ClO$^-$ ion content, expressed as NaClO, is typically less than about 10 mg/l, most often less than 2 mg/l.

The proper progress of the destruction of the hypochlorites may be observed vis-a-vis the value of the redox potential of the chlorate solution measured with a calomel reference electrode and a platinum measuring electrode.

The statement that the destruction of the hypochlorites does not adversely affect the hexavalent chromium signifies that the disappearance of chromium having a valence of 6+ is negligible, generally less than 0.01% and often less than 0.001%.

In order to further illustrate the present invention and the advantages thereof, the following specific examples are given, it being understood that same are intended only as illustrative and in nowise limitative.

In said examples to follow, the process of the invention was carried out continuously. EXAMPLE 1

A sodium chlorate solution, produced by the electrolysis of an aqueous solution of sodium chloride in the presence of hexavalent chromium in the form of sodium bichromate, and then maintained for 3 hours in an evolution reactor, contained, per liter: 500 g sodium chlorate, 150 g sodium chloride, 0.26 g hypochlorites or ClO$^-$ ions, expressed as NaClO, and also 4 g sodium bichromate, Na$_2$Cr$_2$O$_7$. It did not contain, other than the ClO$^-$ ions, any compound that would effect appreciable decomposition of hydrogen peroxide.

To this solution, which was in a state of continuous flow, an amount of hydrogen peroxide was continuously added, as a 50% by weight aqueous solution of hydrogen peroxide, this amount being such that the molar ratio available hydrogen peroxide/hypochlorites was equal to 1.

This addition of the hydrogen peroxide was carried out immediately upstream of the introduction of the chlorate solution into a reactor for the destruction of the hypochlorites, the contents of which being agitated by the external recirculation thereof.

In the destruction reactor, the retention time of the chlorate solution with the added hydrogen peroxide was 2 min, the temperature 70° C. and the pH 5.8.

At the outlet of the destruction reactor, the chlorate solution (from which the chlorate was subsequently separated by crystallization) contained less than 2 mg hypochlorites per liter, expressed as NaClO, and only 0.006% of the hexavalent bichromate initially present did not now have a valence of 6+.

EXAMPLE 2

The procedure of Example 1 was repeated, but by adding the hydrogen peroxide to the chlorate solution in such manner that the molar ratio available hydrogen peroxide/hypochlorites was equal to 1.1.

The ClO$^-$ ions were consumed with the same efficiency as in Example 1, while the amount of chromium not present in the form of Cr$^{6+}$ at the outlet of the destruction reactor did not exceed 0.01% of the amount of Cr$^{6+}$ initially present in the form of sodium bichromate.

EXAMPLE 3

Results similar to those obtained in Examples 1 and 2 were obtained by repeating the process described therein, but using a chlorate solution containing, per liter, 605 g sodium chlorate, 105 g sodium chloride, 5 g sodium bichromate and 1.3 g ClO$^-$ ions, expressed as NaClO, and maintaining in the destruction reactor a pH of 6, a temperature of 68° C. and a retention time of 6 min.

EXAMPLE 4

To a solution of sodium chlorate having a composition as in Example 1, but containing compounds which, in the absence of hypochlorites, were determined to destroy a fraction of the hydrogen peroxide added thereto, an amount of hydrogen peroxide was added such that the molar ratio hydrogen peroxide/hypochlorites was equal to 2. The molar ratio available hydrogen peroxide/hypochlorites was thus equal to 1.1.

By repeating the procedure of Example 1, but with a retention time of the chlorate solution with the added hydrogen peroxide being 20 min, the results obtained relative to the destruction of hypochlorites and the preservation of the Cr$^{6+}$ ions were similar to those of Example 1.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the consumption of the hypochlorite values, ClO$^-$ ions, contained in a solution of an alkali metal chlorate produced by electrolysis of an aqueous solution of a chloride of said alkali metal, without adversely affecting the valence state of hexavalent chromium values also contained therein, comprising intimately contacting such chlorate solution with an effective amount of hydrogen peroxide such that the molar ratio of hydrogen peroxide/hypochlorites is at least one and no greater than three and the molar ratio of available hydrogen peroxide/hypochlorites is at least one.

2. The process as defined by claim 1, comprising intimately contacting such chlorate solution with the hydrogen peroxide after the evolution thereof.

3. The process as defined by claim 1, said chlorate solution comprising no more than 1.5 g ClO$^-$ ions per liter, expressed as NaClO.

4. The process as defined by claim 1, said molar ratio of available hydrogen peroxide/hypochlorites being no greater than 1.1.

5. The process as defined by claim 1, carried out at a pH ranging from 5.5 to 7.

6. The process as defined by claim 1, carried out at a temperature ranging from 40° to 80° C.

7. The process as defined by claim 1, said chlorate comprising sodium chlorate.

* * * * *